United States Patent
Gao et al.

(10) Patent No.: US 9,317,367 B2
(45) Date of Patent: Apr. 19, 2016

(54) RE-DISTRIBUTING HIGH USAGE DATA IN A RAID SOLID STATE DRIVE ARRAY

(71) Applicant: GLOBALFOUNDRIES INC., Grand Cayman (KY)

(72) Inventors: Xue D. Gao, Shanghai (CN); Jeffrey R. Steffan, San Jose, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 163 days.

(21) Appl. No.: 13/956,774

(22) Filed: Aug. 1, 2013

(65) Prior Publication Data

US 2015/0039935 A1 Feb. 5, 2015

(51) Int. Cl.
*G06F 12/02* (2006.01)
*G06F 11/10* (2006.01)

(52) U.S. Cl.
CPC ...... *G06F 11/108* (2013.01); *G06F 2212/7206* (2013.01); *G06F 2212/7208* (2013.01); *G06F 2212/7211* (2013.01)

(58) Field of Classification Search
CPC .............. G06F 2212/7206; G06F 2212/7208; G06F 2212/7211
See application file for complete search history.

(56) References Cited

U.S. PATENT DOCUMENTS

| | | | |
|---|---|---|---|
| 7,139,863 B1 * | 11/2006 | Defouw et al. | 711/103 |
| 7,865,761 B1 | 1/2011 | Chilton | |
| 8,321,597 B2 | 11/2012 | Yu et al. | |
| 8,341,332 B2 | 12/2012 | Ma et al. | |
| 8,356,152 B2 | 1/2013 | You | |
| 2009/0240873 A1 * | 9/2009 | Yu et al. | 711/103 |
| 2011/0010488 A1 * | 1/2011 | Aszmann et al. | 711/103 |
| 2011/0066882 A1 * | 3/2011 | Walls et al. | 714/6.24 |
| 2012/0131381 A1 * | 5/2012 | Eleftheriou et al. | 714/6.3 |
| 2012/0260029 A1 | 10/2012 | Walls et al. | |
| 2012/0278543 A1 | 11/2012 | Yu et al. | |
| 2013/0179631 A1 * | 7/2013 | Cepulis | 711/103 |
| 2014/0181437 A1 * | 6/2014 | Bruso et al. | 711/162 |
| 2014/0317206 A1 * | 10/2014 | Lomelino et al. | 709/206 |

FOREIGN PATENT DOCUMENTS

WO 2012060824 A1 5/2012

OTHER PUBLICATIONS

Kadav et al., Differential RAID: Rethinking RAID for SSD Reliability, <http://research.microsoft.com/en-us/um/people/maheshba/papers/hotstorage09-raid.pdf>, provided by Giorgio Via (searcher) in search report dated Jan. 23, 2013.

* cited by examiner

*Primary Examiner* — Joseph Schell
(74) *Attorney, Agent, or Firm* — Scully Scott Murphy and Presser

(57) ABSTRACT

A computing device collects wear life data of a first and a second solid state drive, wherein each solid state drive includes at least one stride, and wherein wear life data is data which includes information regarding wear and deterioration of each stride of each solid state drive. Based on the collected wear life data, the computing device determines the first solid state drive contains more high usage strides than the second solid state drive, wherein a high usage stride is a stride containing high usage data. The computing device then re-allocates data from at least one high usage stride of the first solid state drive to a stride of the second solid state drive, wherein the re-allocated data includes parity data.

15 Claims, 5 Drawing Sheets

FIG. 4

RE-DISTRIBUTING HIGH USAGE DATA IN A RAID SOLID STATE DRIVE ARRAY

FIELD OF THE INVENTION

The present invention relates generally to solid state drives, and more particularly to improving performance and reliability in a solid state drive array by utilizing wear life data.

BACKGROUND

A solid state drive (SSD) is a data storage device using integrated circuit assemblies as memory to store data persistently. SSDs have no moving mechanical components, which distinguish them from traditional electromechanical magnetic disks such as hard disk drives (HDDs) or floppy disks, which contain spinning disks and movable read/write heads. Compared with electromechanical disks, SSDs are typically less susceptible to physical shock, run more quietly, have lower access time, and less latency. In addition, most SSDs use NAND-based flash memory, which retains data without power. However, since NAND-flash memory has a finite limit of program-erase cycles, monitoring and managing the wear is critical to reliability of the drive.

SSDs have performance advantages in random workloads when compared to HDDs. In a tiered storage system, such as a RAID (redundant array of independent disks) array, the basic use case is to move random workloads to an SSD array. However, random workloads result in more parity updates in a RAID array, so the SSDs will have more write operations. More write operations result in the SSD reaching its write limit faster, increasing the likelihood the drive will fail.

SUMMARY

Embodiments of the present invention provide a method, system, and computer program product for re-distributing high usage parity data in a RAID solid state drive array. A computing device collects wear life data of a first and a second solid state drive, wherein each solid state drive includes at least one stride, and wherein wear life data is data which includes information regarding wear and deterioration of each stride of each solid state drive. Based on the collected wear life data, the computing device determines the first solid state drive contains more high usage strides than the second solid state drive, wherein a high usage stride is a stride containing high usage data. The computing device then re-allocates data from at least one high usage stride of the first solid state drive to a stride of the second solid state drive, wherein the re-allocated data includes parity data.

BRIEF DESCRIPTION OF THE SEVERAL VIEWS OF THE DRAWINGS

FIG. 4 is an illustration that depicts the SSDs of the RAID array of FIG. 1 after re-distribution of data by the RAID Adapter of FIG. 1, in accordance with an embodiment of the invention.

DETAILED DESCRIPTION

Figure 1:
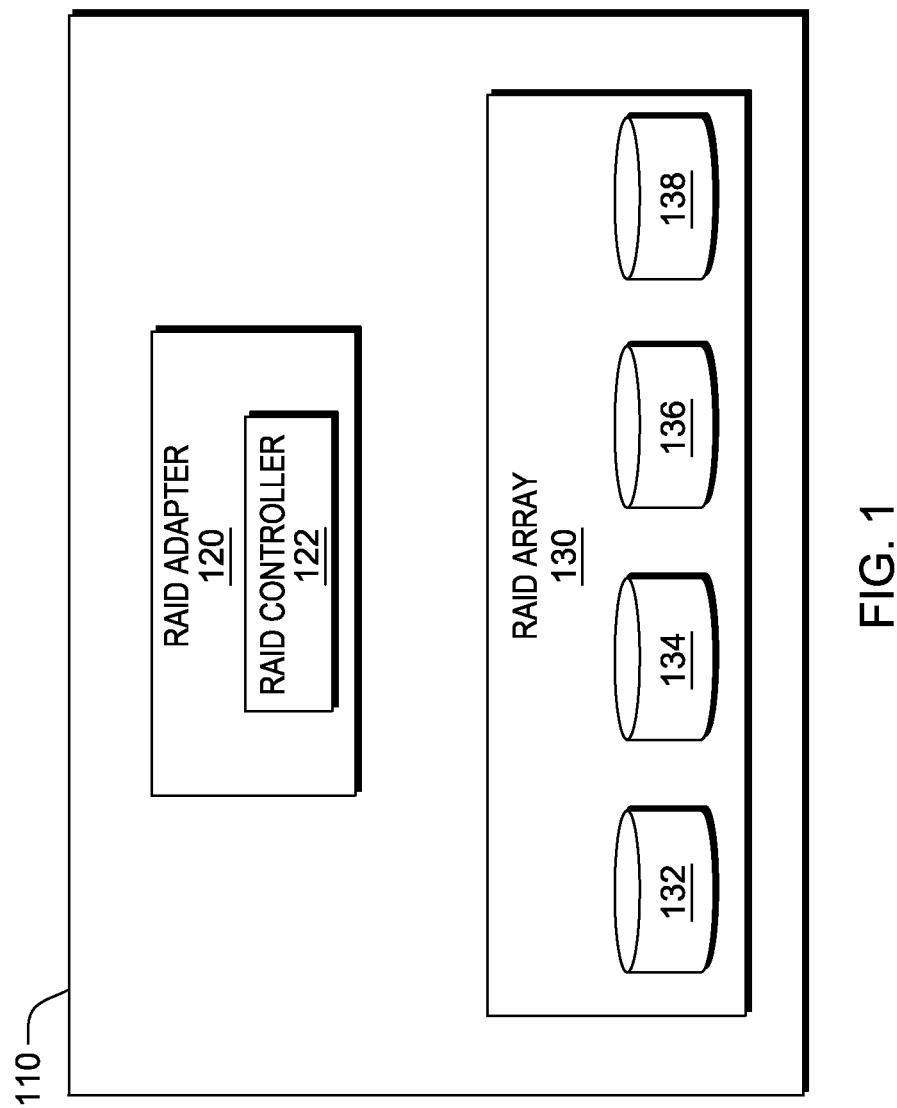
FIG. 1 illustrates a computing device for re-distributing data in a RAID array, in accordance with an embodiment of the invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module" or "system." Furthermore, aspects of the present invention may take the form of a computer program product embodied in one or more computer-readable medium(s) having computer readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by, or in connection with, an instruction execution system, apparatus, or device.

A computer-readable signal medium may include a propagated data signal with computer-readable program code embodied therein, for example, in baseband or as part of a carrier wave. Such a propagated signal may take any of a variety of forms including, but not limited to, electro-magnetic, optical, or any suitable combination thereof. A computer-readable signal medium may be any computer-readable medium that is not a computer-readable storage medium and that can communicate, propagate, or transport a program for use by, or in connection with, an instruction execution system, apparatus, or device.

Program code embodied on a computer-readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the accompanying Figures.

FIG. 1 depicts computing device 110, in accordance with an exemplary embodiment of the invention. In the exemplary embodiment, computing device 110 includes RAID adapter 120 and RAID array 130. Computing device 110 may be a desktop computer, a notebook, a laptop computer, a tablet computer, a handheld device, a smart-phone, a thin client, or any other electronic device or computing system capable of executing program instructions and supporting the functionality required of specific embodiments of the invention. The components of computing device 110 are described in more detail with reference to FIG. 3.

RAID array 130 includes SSD 132, SSD 134, SSD, 136, and SSD 138. In the exemplary embodiment, RAID array 130 is logical unit that is comprised of multiple solid state drives. In general, data may be distributed across the drives of a RAID array based on the level of redundancy and performance required.

SSD 132, SSD 134, SSD 136, and SSD 138 are data storage devices (solid state drives) which use integrated circuit assemblies as memory to store data persistently. In the exemplary embodiment, SSD 132, SSD 134, SSD 136, and SSD 138 each contain a plurality of strides.

RAID Adapter 120 includes RAID controller 122. In the exemplary embodiment, RAID adapter 120 is a hardware device capable of determining the most effective manner in which to re-distribute data between the SSDs of RAID array 130, based on the wear life data of each SSD of RAID array 130, in order to improve performance, minimize wear, and increase reliability of RAID array 130.

In the exemplary embodiment, RAID controller 122 is software capable of collecting wear life data of each SSD of RAID array 130 at a pre-defined sampling rate.

Figure 2:
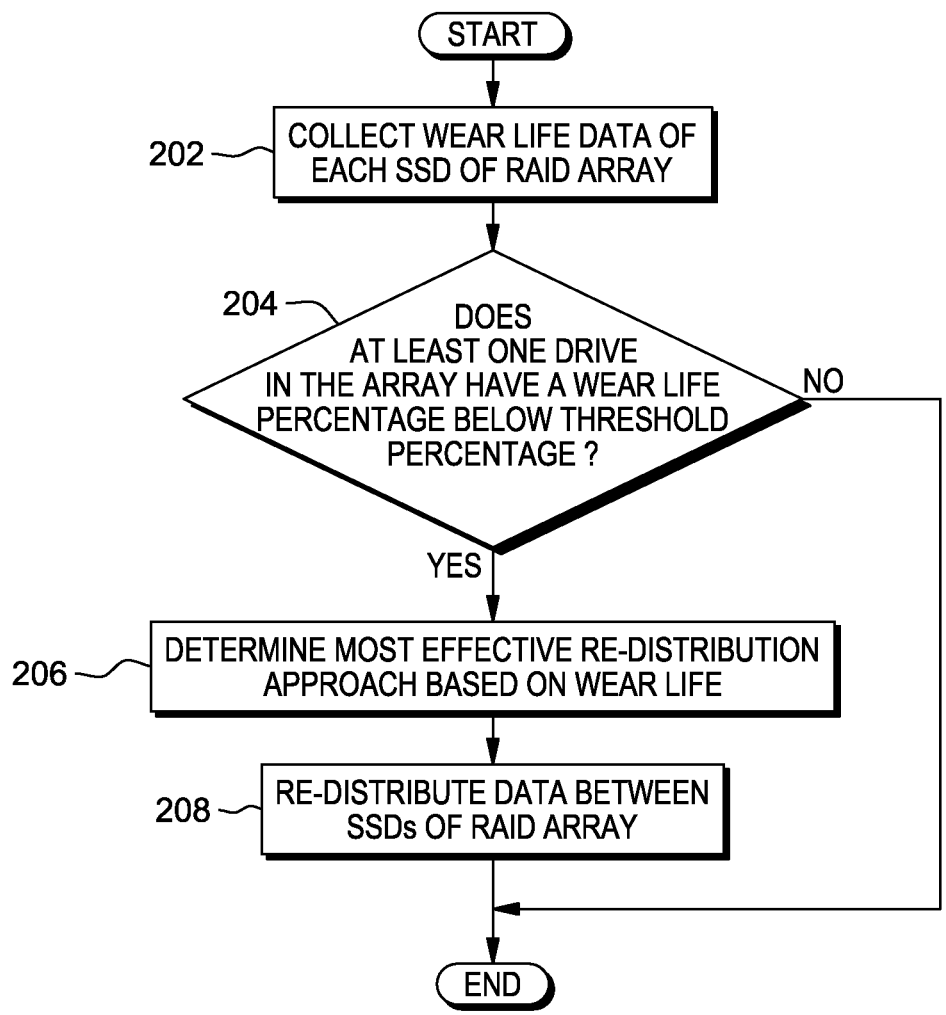
FIG. 2 is a flowchart illustrating the operations of the RAID adapter of FIG. 1 in determining the most effective manner in which to re-distribute data among solid state drives of a RAID array, in accordance with an embodiment of the invention.

FIG. 2 is a flowchart illustrating the operation of RAID adapter 120 in determining the most effective manner in which to re-distribute data between the SSDs of RAID array 130, in accordance with an exemplary embodiment of the invention. In the exemplary embodiment, RAID controller 122 collects wear life data of each SSD of RAID array 130, i.e., SSD 132, SSD 134, SSD 136, and SSD 138 at a pre-defined sampling rate (step 202). In the exemplary embodiment, the pre-defined sampling rate is once every four hours; however, in other embodiments, the pre-defined sampling rate may be a different rate. Wear life data includes data that details the approximate number of write operations that can still be performed on a drive. In other words, an SSD has an associated expected number of write operations that can be performed on the drive. RAID controller 122 compares this expected number for each SSD to the number of writes that have been performed on the drive to determine the wear life, which is expressed as a percentage value that details the approximate amount of life (number of writes) left on the drive. In addition, wear life data also details wear at a stride level for each SSD. Therefore, by analyzing the wear life data, RAID Adapter 120 can determine the amount of wear that has taken place on each stride of each SSD.

RAID Adapter 120 then determines if at least one SSD of RAID array 130 has a wear life percentage below a threshold percentage (decision 204). In the exemplary embodiment, the threshold percentage is 50%; however, in other embodiments, the threshold percentage may be a different value. In essence, if the wear life percentage of an SSD is below the threshold percentage, the SSD is a high wear drive and therefore may not be reliable enough to store certain valuable data. If RAID Adapter 120 determines that at least one SSD of RAID array 130 does not have a wear life percentage below the threshold percentage (decision 204, "NO" branch), no SSD of RAID array 130 is a high wear drive and therefore RAID Adapter 120 does not need to re-distribute any data between SSDs of RAID array 130.

If RAID Adapter 120 determines that at least one SSD of RAID array 130 does have a wear life percentage below the threshold percentage (decision 204, "YES" branch), RAID Adapter 120 determines the most effective manner in which to re-distribute data between SSDs of RAID array 130 based on the wear life data of each SSD (step 206). In the exemplary embodiment, RAID Adapter 120 re-distributes data in a balanced manner so that each SSD of RAID array 130 has an approximately equivalent amount of high usage data. In the exemplary embodiment, high usage data corresponds to the wear life of a stride. Therefore, if a stride is a high wear stride, as determined by comparison with the threshold percentage in a similar manner as described above, the data stored on the stride is high usage data. Therefore, RAID adapter 120 determines a re-distribution approach so that each SSD of RAID array 130 has an equivalent number of strides containing high usage data. Furthermore, in other embodiments, RAID Adapter 120 may also take into account whether a stride contains a parity element. If a stride contains a parity element, the wear life of the stride may be higher than a stride which does not contain a parity element because the RAID write penalty associated with the updating of the parity element and data on the parity stride results in more write operations being performed on the stride, which in turn results in higher wear on the stride. Therefore, in other embodiments, RAID Adapter 120 may determine a re-distribution approach which takes into account both the wear on each stride and whether or not a parity element is present on each stride.

Using the determined re-distribution approach, RAID adapter 120 then re-distributes the data between the SSDs of RAID array 130 in a manner so that each SSD has an equivalent number of strides containing high usage data (step 208).

Figure 3:
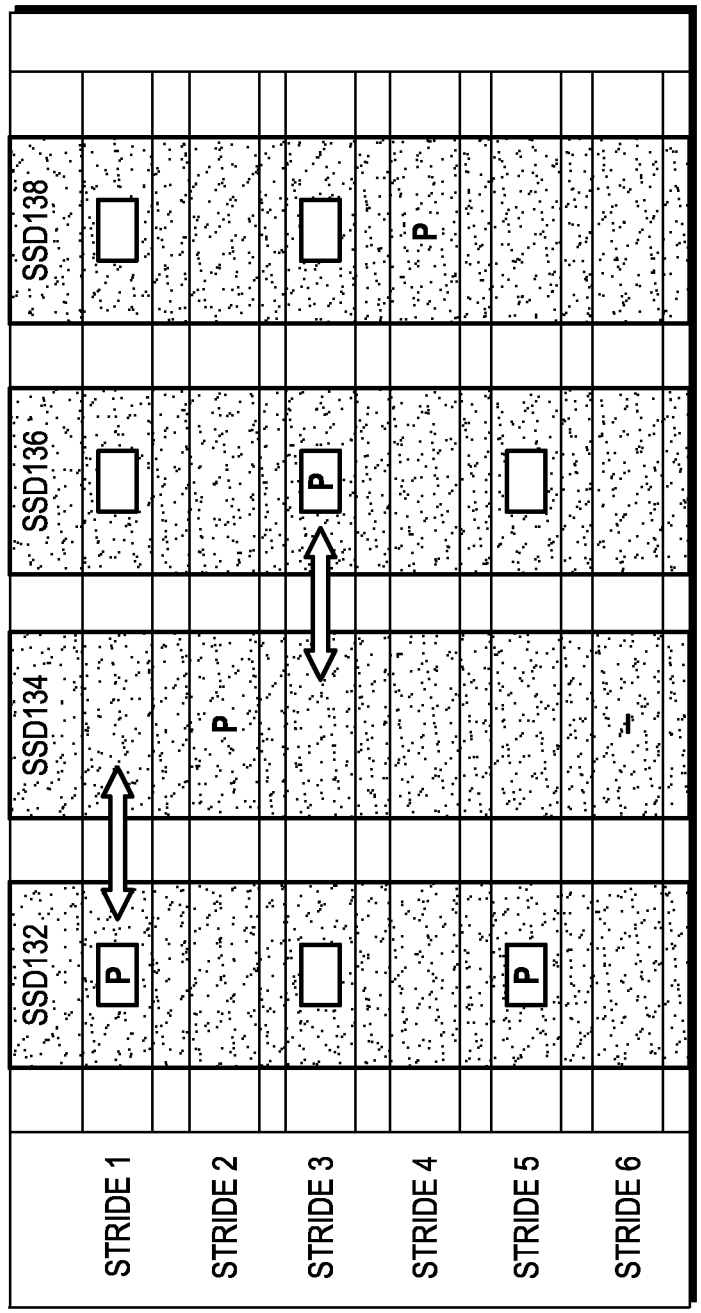
FIG. 3 is an illustration that depicts the SSDs of the RAID array of FIG. 1 prior to a re-distribution of data by the RAID Adapter of FIG. 1, in accordance with an embodiment of the invention.

FIG. 3 is an illustration that depicts the SSDs of RAID array 130 prior to a re-distribution of data by RAID Adapter 120, in accordance with an exemplary embodiment of the invention. In the exemplary embodiment, strides 1, 3 and 5 of SSD 132, strides 1, 3 and 5 of SSD 136, and strides 1 and 3 of SSD 138 contain high usage data. In addition, strides 1 and 5 of SSD 132, stride 2 of SSD 134, stride 3 of SSD 136, and stride 4 of SSD 138 contain parity data. As depicted, SSD 134 contains no high usage data, while the other SSDs of RAID array 130 contain at least two strides that contain high usage data. In the exemplary embodiment, RAID Adapter has determined that at least one of the SSDs 132, 136, and 138 of RAID array 130 has a wear life percentage that is below the threshold percentage and therefore a re-distribution of data is in order.

Figure 4:
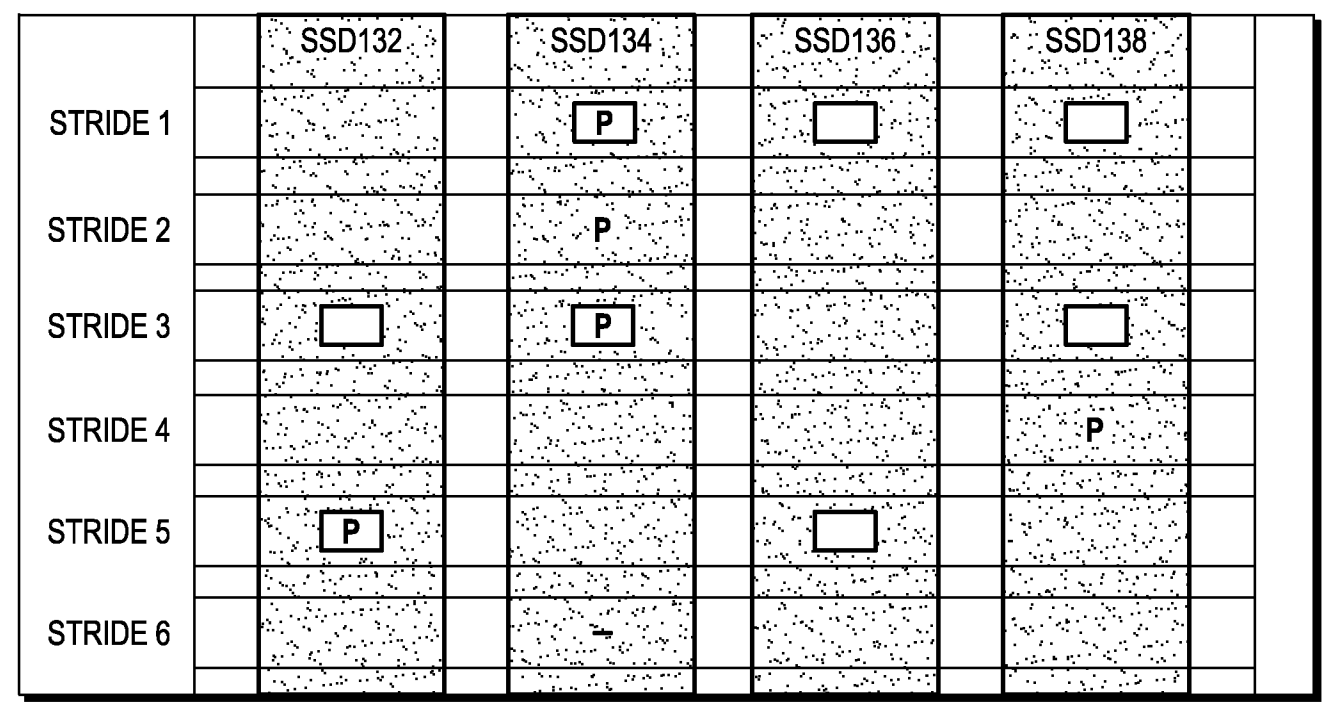

FIG. 4 is an illustration that depicts the SSDs of RAID array 130 after re-distribution of data by RAID Adapter 120, in accordance with an exemplary embodiment of the invention. In the exemplary embodiment, RAID Adapter 120 has re-distributed high usage data, moving high usage data from stride 1 of SSD 132 to stride 1 of SSD 134 and moving high usage data from stride 3 of SSD 136 to stride 3 of SSD 134. As depicted, this re-distribution by RAID Adapter 120 creates an even distribution of high usage data among the SSDs of RAID array 130.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention, as defined by the accompanying claims.

Figure 5:
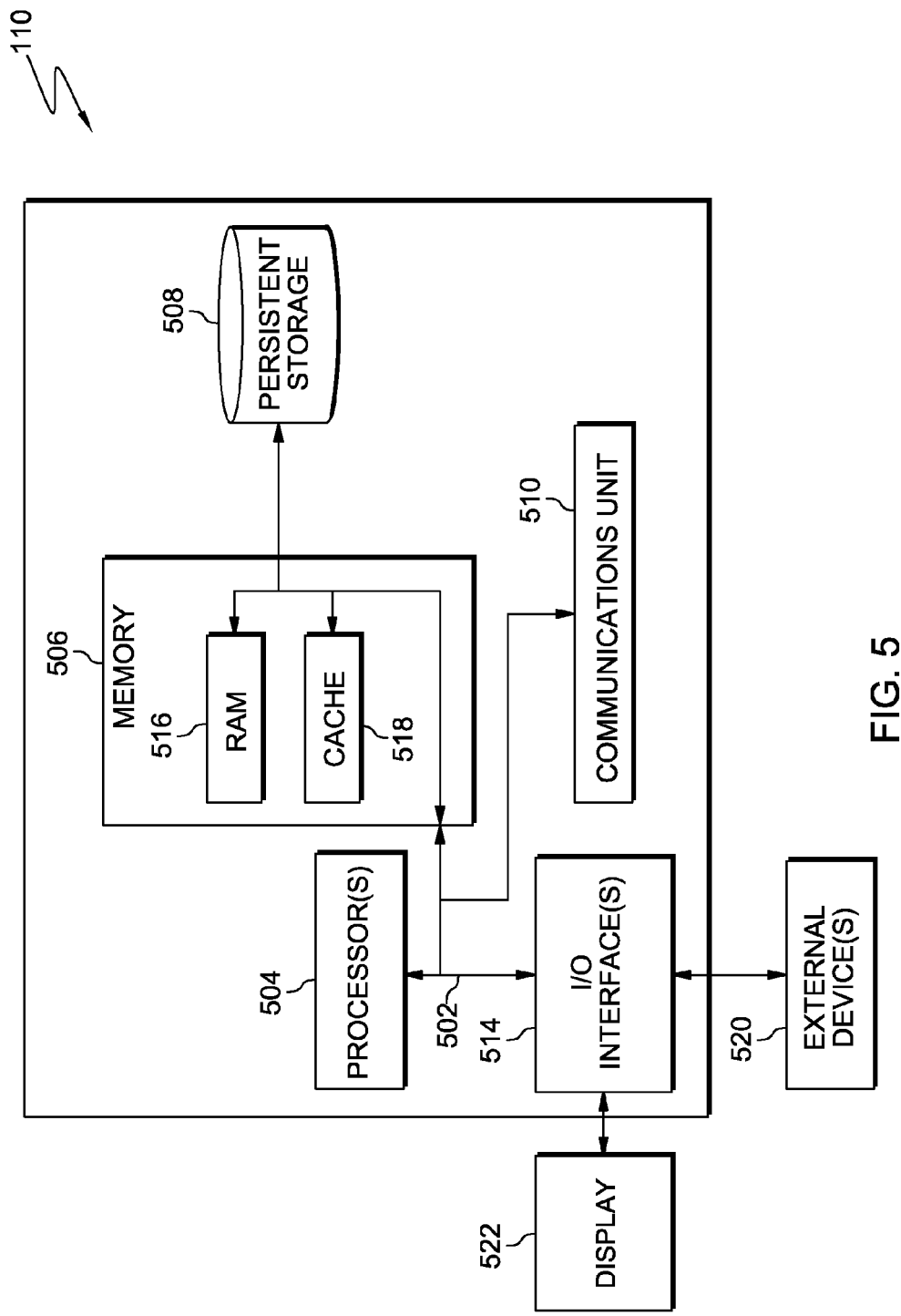
FIG. 5 is a block diagram depicting the hardware components of the computing device of FIG. 1, in accordance with an embodiment of the invention.

FIG. 5 depicts a block diagram of components of computing device 110, in accordance with an illustrative embodiment. It should be appreciated that FIG. 5 provides only an illustration of one implementation and does not imply any limitations with regard to the environment in which different embodiments may be implemented. Many modifications to the depicted environment may be made.

Computing device 110 includes communications fabric 502, which provides communications between computer processor(s) 504, memory 506, persistent storage 508, communications unit 510, and input/output (I/O) interface(s) 514.

Memory 506 and persistent storage 508 are examples of computer-readable tangible storage devices and media. Memory 506 may be, for example, one or more random access memories (RAM) 516, cache 518, or any other suitable volatile or non-volatile storage device.

Programs, such as the RAID controller 122, are stored in persistent storage 508 for execution by one or more of the respective computer processors 504 via one or more memories of memory 506. In the embodiment illustrated in FIG. 5, persistent storage 508 includes flash memory. Alternatively, or in addition to flash memory, persistent storage 508 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 508 may also be removable. For example, a removable hard drive may be used for persistent storage 508. Other examples include an optical or magnetic disk that is inserted into a drive for transfer onto another storage device that is also a part of persistent storage 508, or other removable storage devices such as a thumb drive or smart card.

Communications unit 510, in these examples, provides for communications with other data processing systems or devices. In these examples, communications unit 510 includes one or more network interface cards. Communications unit 510 may provide communications through the use of either or both physical and wireless communications links. Programs, such as RAID controller 122, may be downloaded to persistent storage 508 through communications unit 510.

I/O interface(s) 514 allows for input and output of data with other devices that may be connected to computing device 110. For example, I/O interface 514 may provide a connection to external devices 520 such as a keyboard, keypad, a touch screen, and/or some other suitable input device. I/O interface(s) may also connect to display 522. External devices 520 can also include portable computer-readable storage media such as, for example, thumb drives, portable optical or magnetic disks, and memory cards. Software and data used to practice embodiments of the present invention, e.g., the program RAID controller 122 in computing device 110 can be stored on such portable computer-readable storage media and can be loaded onto persistent storage 508 via I/O interface(s) 514. I/O interface(s) 514 also connect to a display 522.

Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A method for re-distributing high usage parity data in a RAID solid state drive array, comprising the steps of:
 a computing device collecting wear life data of a first and a second solid state drive, wherein each solid state drive includes at least one stride, and wherein wear life data is data which includes information regarding wear and deterioration of each stride of each solid state drive;

based on the collected wear life data, the computing device determining whether at least one of the first and second solid state drives has a wear life below a defined threshold;

when the computing device determines that at least one of the first and second solid state drives has a wear life below the defined threshold, based on the collected wear life data, the computing device determining the first solid state drive contains more high usage strides than the second solid state drive, wherein a high usage stride is a stride containing high usage data; and the computing device re-allocating data from at least one high usage stride of the first solid state drive to a stride of the second solid state drive, wherein the re-allocated data includes parity data.

2. The method of claim 1, further comprising the steps of:

the computing device determining a first wear life percentage for the first solid state drive and a second wear life percentage for the second solid state drive, wherein the wear life percentage indicates the wear level of a solid state drive, and wherein the wear life percentage is based on the collected wear life data; and the computing device determining that at least one of the first and second wear life percentages is below a wear threshold percentage.

3. The method of claim 1, wherein the step of re-allocating data further comprises the computing device re-allocating data from at least one high usage stride of the first solid state drive to a low usage stride of second solid state drive, wherein a low usage stride is a stride that has low wear.

4. The method of claim 1, wherein the step of re-allocating data further comprises the computing device re-allocating data from at least one high usage stride of the first solid state drive to a low usage stride of the second solid state drive, wherein a low usage stride is a stride containing low usage data.

5. The method according to claim 1, wherein the computing device determining the first solid state drive contains more high usage strides than the second solid state device includes comparing each of the strides of the first and second solid state drives to a given threshold to determine if said each stride is a high usage stride.

6. The method according to claim 5, wherein each of the strides has a wear life, and the comparing each of the strides to a given threshold includes comparing the wear life of each of the strides to a given wear life threshold.

7. The method according to claim 1, wherein the re-allocating data includes re-allocating data among the strides of the first and second solid state drives so that the first and second solid state drives have an equal number of high usage strides.

8. A computer program product for re-distributing high usage parity data in a RAID solid state drive array, the computer program product comprising:

one or more computer-readable hardware storage devices and program instructions tangibly stored on at least one of the one or more tangible hardware storage devices, the program instructions comprising:

program instructions to collect wear life data of a first and a second solid state drive, wherein each solid state drive includes at least one stride, and wherein wear life data is data which includes information regarding wear and deterioration of each stride of each solid state drive;

based on the collected wear life data, further program instructions to determine whether at least one of the first and second solid state drives has a wear life below a defined threshold;

when the further program instructions determines that at least one of the first and second solid state drives has a wear life below the defined threshold, based on the collected wear life data, program instructions to determine the first solid state drive contains more high usage strides than the second solid state drive, wherein a high usage stride is a stride containing high usage data; and program instructions to re-allocate data from at least one high usage stride of the first solid state drive to a stride of the second solid state drive, wherein the re-allocated data includes parity data.

9. The computer program product of claim 8, further comprising:

program instructions to determine a first wear life percentage for the first solid state drive and a second wear life percentage for the second solid state drive, wherein the wear life percentage indicates the wear level of a solid state drive, and wherein the wear life percentage is based on the collected wear life data; and program instructions to determine that at least one of the first and second wear life percentages is below a wear threshold percentage.

10. The computer program product of claim 8, wherein the step of re-allocating data further comprises the computing device re-allocating data from at least one high usage stride of the first solid state drive to a low usage stride of second solid state drive, wherein a low usage stride is a stride that has low wear.

11. The computer program product of claim 8, wherein the program instructions to re-allocate data further comprises program instructions to re-allocate data from at least one high usage stride of the first solid state drive to a low usage stride of the second solid state drive, wherein a low usage stride is a stride containing low usage data.

12. A computer system for re-distributing high usage parity data in a RAID solid state drive array, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to collect wear life data of a first and a second solid state drive, wherein each solid state drive includes at least one stride, and wherein wear life data is data which includes information regarding wear and deterioration of each stride of each solid state drive;

based on the collected wear life data, further program instructions to determine whether at least one of the first and second solid state drives has a wear life below a defined threshold;

when the further program instructions determines that at least one of the first and second solid state drives has a wear life below the defined threshold, based on the collected wear life data, program instructions to determine the first solid state drive contains more high usage strides than the second solid state drive, wherein a high usage stride is a stride containing high usage data; and program instructions to re-allocate data from at least one high usage stride of the first solid state drive to a stride of the second solid state drive, wherein the re-allocated data includes parity data.

13. The computer system of claim 12, further comprising:
program instructions to determine a first wear life percentage for the first solid state drive and a second wear life percentage for the second solid state drive, wherein the wear life percentage indicates the wear level of a solid state drive, and wherein the wear life percentage is based on the collected wear life data; and
program instructions to determine that at least one of the first and second wear life percentages is below a wear threshold percentage.

14. The computer system of claim 12, wherein the step of re-allocating data further comprises the computing device re-allocating data from at least one high usage stride of the first solid state drive to a low usage stride of second solid state drive, wherein a low usage stride is a stride that has low wear.

15. The computer system of claim 12, wherein the program instructions to re-allocate data further comprises program instructions to re-allocate data from at least one high usage stride of the first solid state drive to a low usage stride of the second solid state drive, wherein a low usage stride is a stride containing low usage data.

* * * * *